(12) United States Patent
Kim et al.

(10) Patent No.: US 7,848,754 B2
(45) Date of Patent: Dec. 7, 2010

(54) DUAL BAND/DUAL MODE MOBILE COMMUNICATION TERMINAL AND CONTROL METHOD THEREOF

(75) Inventors: Hyun-Wook Kim, Gyeonggi-do (KR); Young-Lak Kim, Gyeonggi-do (KR); Nam-Gun Kim, Seoul (KR); Jong-Tae Ihm, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 499 days.

(21) Appl. No.: 11/576,271

(22) PCT Filed: Jan. 5, 2005

(86) PCT No.: PCT/KR2005/000021

§ 371 (c)(1),
(2), (4) Date: Oct. 4, 2007

(87) PCT Pub. No.: WO2006/073212

PCT Pub. Date: Jul. 13, 2006

(65) Prior Publication Data

US 2008/0161039 A1 Jul. 3, 2008

(51) Int. Cl.
H04W 36/00 (2009.01)
H04W 4/00 (2009.01)
H04M 1/00 (2006.01)

(52) U.S. Cl. .............. 455/436; 455/432.1; 455/435.2; 455/552.1; 370/328; 370/331

(58) Field of Classification Search ............... 455/432.1, 455/435.2, 436, 552.1, 553.1; 370/331, 328
See application file for complete search history.

(56) References Cited

U.S. PATENT DOCUMENTS 4,910,521 A  3/1990 Mellon
6,246,673 B1 *  6/2001 Tiedemann et al. ......... 370/333
6,298,244 B1  10/2001 Boesch et al.
6,484,013 B1  11/2002 Ishii
2005/0073977 A1 *  4/2005 Vanghi et al. ............... 370/335

FOREIGN PATENT DOCUMENTS

| JP | 2001-186552 | 7/2001 |
|----|---|---|
| JP | 2001-189955 | 7/2001 |
| JP | 2001-224052 | 8/2001 |
| JP | 2002-232930 | 8/2002 |
| JP | 2004-328135 | 11/2004 |
| WO | 2004/091244 | 10/2004 |

* cited by examiner

Primary Examiner—Un C Cho
(74) Attorney, Agent, or Firm—Lowe Hauptman Ham & Berner LLP

(57) ABSTRACT

The present invention relates to a dual band/dual mode mobile communication terminal, which can perform stable roaming between synchronous and asynchronous mobile communication networks. The mobile communication terminal of the present invention includes an antenna (410), an asynchronous RF device (420), a synchronous RF device (430), and a common module (440). The antenna (410) transmits/receives radio waves to/from an asynchronous mobile communication network (100) and a synchronous mobile communication network (200). The asynchronous RF device (420) performs asynchronous communication with the asynchronous mobile communication network (100) through the antenna (410). The synchronous RF device (430) performs synchronous communication with the synchronous mobile communication network (200) through the antenna (410). The common module (440) provides common resources at the time of wirelessly communicating with the synchronous and asynchronous mobile communication networks through the synchronous and asynchronous RF devices.

13 Claims, 7 Drawing Sheets

DUAL BAND/DUAL MODE MOBILE COMMUNICATION TERMINAL AND CONTROL METHOD THEREOF

CROSS REFERENCE TO RELATED APPLICATION

This application is the National Phase application of International Application No. PCT/KR2005/000021, filed Jan. 5, 2005, which designates the United States and was published in English. This application, in its entirety, is incorporated herein by reference.

TECHNICAL FIELD

The present invention relates, in general, to mobile communication terminals and, more particularly, to a dual band/dual mode mobile communication terminal, which enables stable roaming between a synchronous mobile communication network and an asynchronous mobile communication network, and a control method thereof.

BACKGROUND ART

Currently, mobile communication service technology can be classified into an asynchronous service environment in Europe and a synchronous service environment in North America. Further, as standards of new mobile communication technology for transmitting packets at high speed, International Mobile Telecommunications (IMT)-2000 service has been developed around North America and Europe.

The synchronous IMT-2000 type of service has been developed into Code Division Multiple Access (CDMA) 2000 1x or CDMA 2000 1x Evolution Data Only (EV-DO), and the asynchronous IMT-2000 type of service has been developed into Wideband CDMA (WCDMA) Universal Mobile Telecommunications System (UMTS) service. In such a service environment a roaming problem between synchronous and asynchronous networks has been raised as the greatest outstanding problem. Accordingly, a terminal supporting dual band/dual mode to enable stable roaming between synchronous and asynchronous mobile communication networks is required.

DISCLOSURE OF THE INVENTION

Accordingly, the present invention has been made keeping in mind the above problems, and an object of the present invention is to provide a dual band/dual mode mobile communication terminal, which enables stable roaming between a synchronous mobile communication network and an asynchronous mobile communication network, and a control method thereof.

BEST MODE FOR CARRYING OUT THE INVENTION

In order to accomplish the above object, the present invention provides a dual band/dual mode mobile communication terminal wirelessly communicating with an asynchronous mobile communication network and a synchronous mobile communication network, comprising an antenna for transmitting/receiving radio waves to/from the asynchronous mobile communication network and the synchronous mobile communication network, an asynchronous Radio Frequency (RF) device for performing asynchronous communication with the asynchronous mobile communication network through the antenna, a synchronous RF device for performing synchronous communication with the synchronous mobile communication network through the antenna, and a common module for providing common resources at the time of wirelessly communicating with the synchronous and asynchronous mobile communication networks through the synchronous and asynchronous RF devices.

Further, the present invention provides a method of controlling a dual band/dual mode mobile communication terminal, comprising a first step of setting a mobile communication network to initially access when power is supplied, a second step of waiting for reception of a signal from the mobile communication network set at the first step, and a third step of performing location registration with the corresponding mobile communication network if the signal has been received at the second step.

Hereinafter, embodiments of the present invention will be described in detail with reference to the attached drawings.

Figure 1:
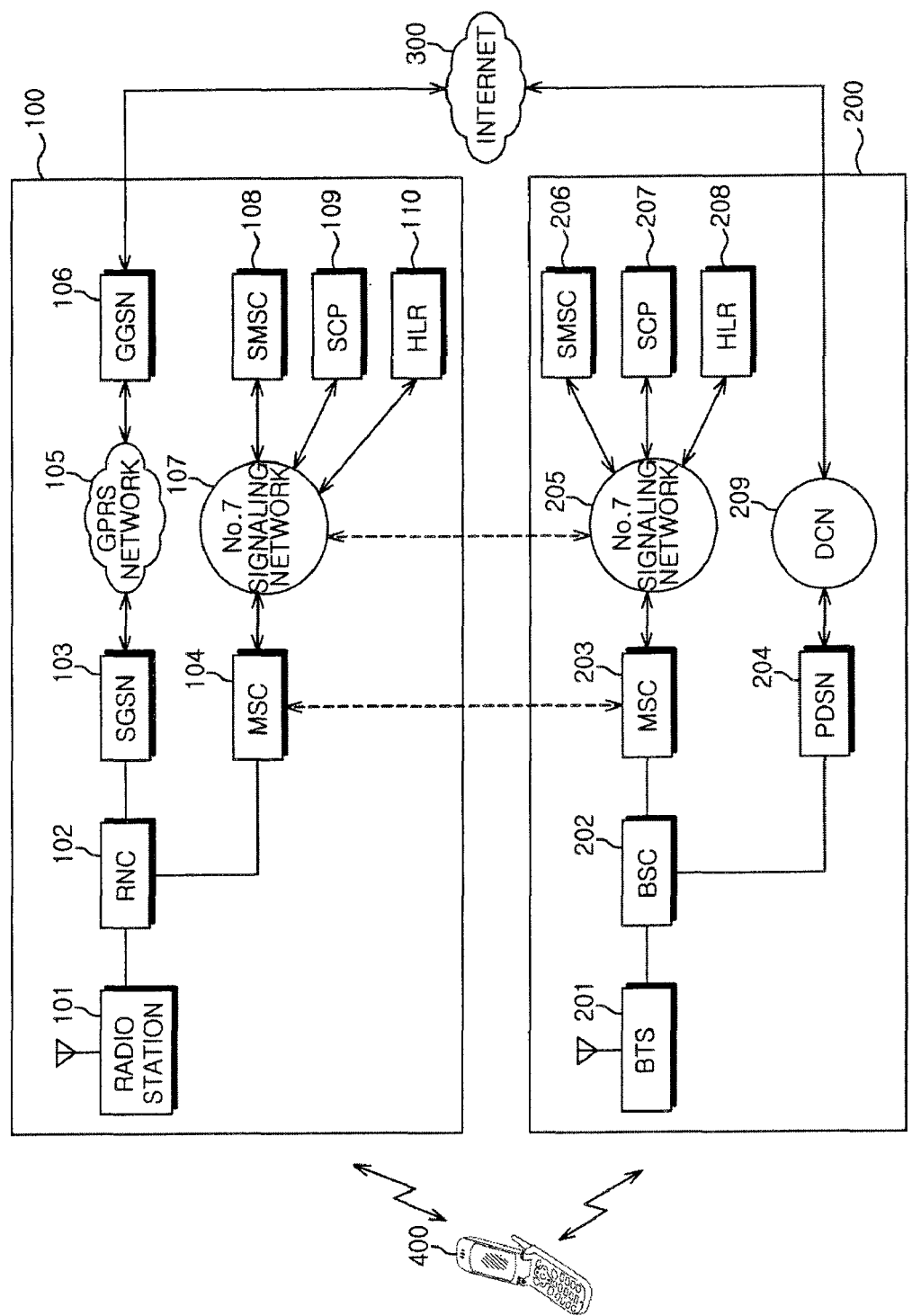
FIG. 1 is a block diagram showing the connection between a mobile communication terminal and mobile communication networks according to the present invention.

FIG. 1 is a block diagram showing the construction of synchronous and asynchronous mobile communication networks according to the present invention.

Referring to FIG. 1, a WCDMA network 100, which is an asynchronous network, includes a radio station 101 for wirelessly communicating with a mobile communication terminal 400, a radio network controller (hereinafter referred to as an "RNC") 102 for controlling the radio station 101, a serving General Packet Radio Service (GPRS) service node (hereinafter referred to as an "SGSN") 103 connected to the RNC 102 to manage the mobility of the mobile communication terminal 400, and a Gateway GPRS Supporting Node (hereinafter referred to as a "GGSN") 106, which is a relay device for controlling packet service and transferring packet data through a GPRS network 105.

Further, a mobile switching center (hereinafter referred to as an "MSC") 104 for performing call switching is connected to the RNC 102, and the MSC 104 is connected to a No. 7 signaling network 107 for signal switching. The No. 7 signaling network 107 is connected to a short message service center (hereinafter referred to as an "SMSC") 108 for serving short messages, an intelligent network controller (hereinafter referred to as a "Service Control Point: SCP") 109, and a home location register (hereinafter referred to as an "HLR") 110 for managing information about the location of a subscriber.

Meanwhile, a CDMA 2000 network 200, which is a synchronous network, includes a base transceiver station hereinafter referred to as a "BTS") 201 for wirelessly communicating with the mobile communication terminal 400, a base station controller (hereinafter referred to as a "BSC") 202 for controlling the BTS 201, a packet data service node (hereinafter referred to as a "PDSN") 204 connected to the BSC 202 to serve packet data, a data core network (hereinafter referred to as a "DCN") 209 connected to the PDSN 204 to provide Internet access service, and a mobile switching center (hereinafter referred to as an "MSC") 203 connected to the BSC 202 to perform call switching.

The MSC 203 is connected to a No. 7 signaling network 205 for signal switching. The No. 7 signaling network 205 is connected to an SMSC 206 for serving short messages, an SCP 207, and a HLR 208 for managing information about the location of a subscriber.

In this embodiment, the synchronous network 200 and the asynchronous network 100 are provided with the HLR 110 and HLR 208, respectively, for managing subscriber information and location information. However, it is possible that the synchronous network 200 and the asynchronous network 100 can share subscriber information and location information using a single HLR (a dual stack home location register).

Figure 2:
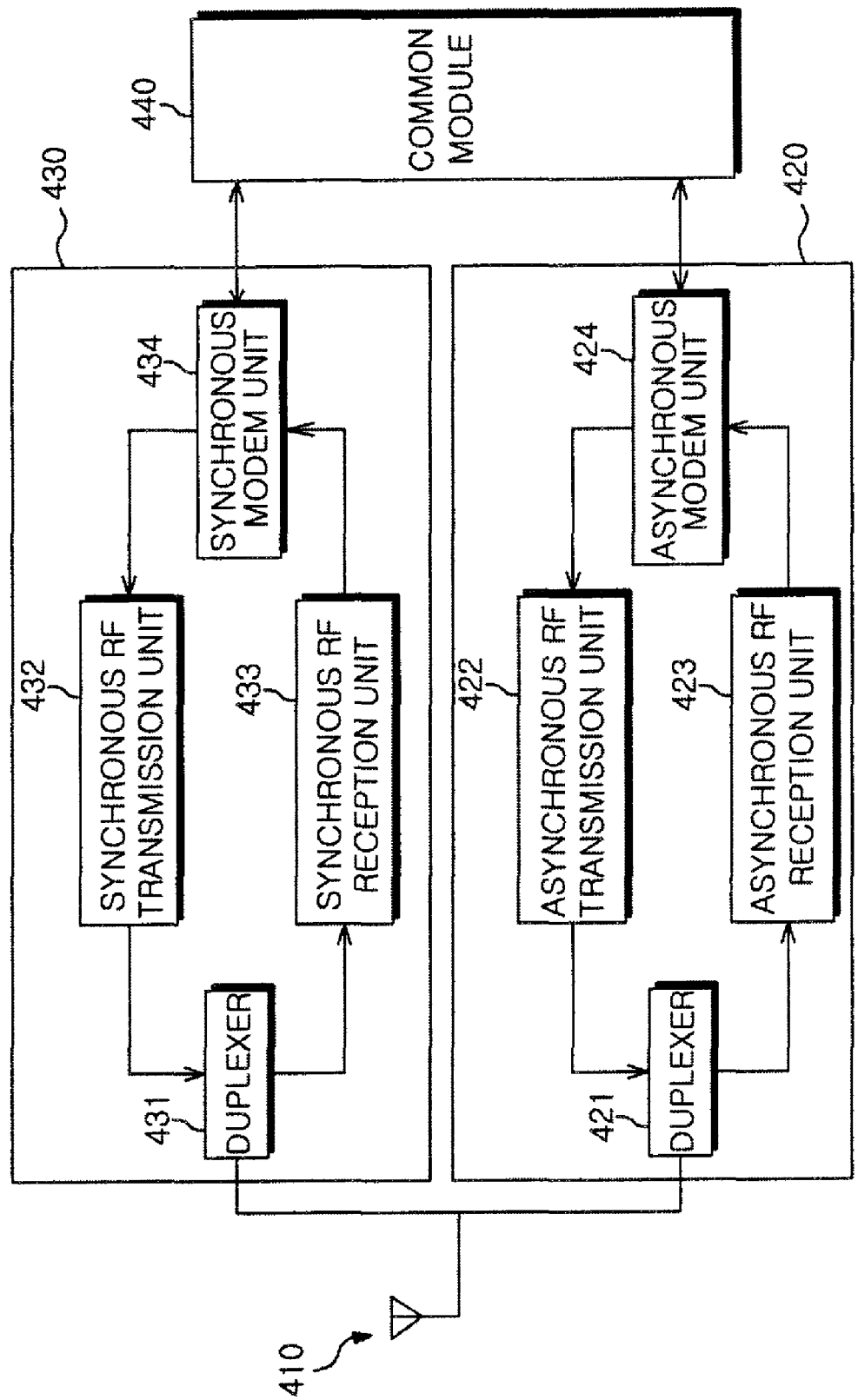
FIG. 2 is a block diagram showing the construction of a mobile communication terminal according to the present invention.

FIG. 2 is a block diagram showing the construction of a dual band/dual mode mobile communication terminal according to the present invention.

Referring to FIG. 2, the dual band/dual mode mobile communication terminal 400 according to the present invention has separate protocol stacks to support synchronous mobile communication and asynchronous mobile communication.

The mobile communication terminal 400 according to the present invention includes an antenna 410 for transmitting/receiving radio waves to/from both the synchronous mobile communication network 200 and the asynchronous mobile communication network 100, a synchronous Radio Frequency (RF) device 430 for performing synchronous communication, an asynchronous RF device 420 for performing asynchronous communication, and a common module 440 for providing common resources at the time of performing synchronous and asynchronous communication.

The synchronous RF device 430 includes a synchronous RF transmission unit 432 for RF transmission, a synchronous RF reception unit 433 for RF reception, and a synchronous modem unit 434. One end of each of the synchronous RF transmission unit 432 and the synchronous RF reception unit 433 is connected to the antenna 410 through a duplexer 431, and the other end thereof is connected to the synchronous modem unit 434.

Further, the asynchronous RF device 420 includes an asynchronous RF transmission unit 422 for RF transmission, an asynchronous RF reception unit 423 for RF reception, and an asynchronous modem unit 424. One end of each of the asynchronous RF transmission unit 422 and the asynchronous RF reception unit 423 is connected to the antenna 410 through a duplexer 421, and the other end thereof is connected to the asynchronous modem unit 424.

Figure 3:
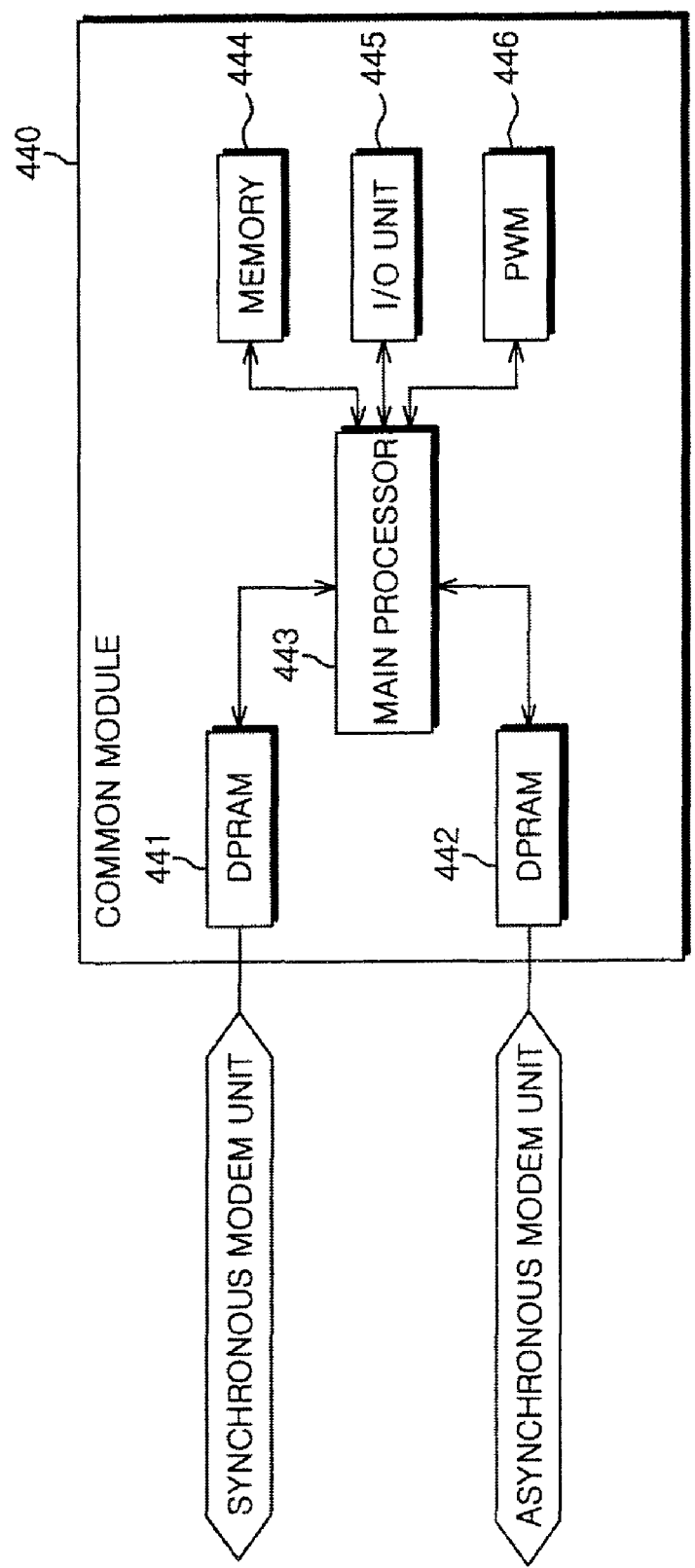
FIG. 3 is a block diagram showing the construction of the common module of FIG. 2.

FIG. 3 is a block diagram showing the construction of the common module of FIG. 2.

Referring to FIG. 3, the common module 440 of the mobile communication terminal according to the present invention includes a plurality of dual port Random Access Memory (RAM) devices hereinafter referred to as "DPRAMs") 441 and 442 that are respectively connected to the modem units 434 and 424 respectively belonging to the synchronous RF device 430 and the asynchronous RF device 420, and a main processor 443 that is connected to the DPRAMs 441 and 442 and is adapted to perform overall control for the synchronous and asynchronous communication of the mobile communication terminal 400 and to execute applications. The main processor 443 is connected to memory 444 for storing data, an I/O unit 445 for interfacing with peripherals, and a power control module (hereinafter referred to as a "PWM") 446 for performing power control.

Figure 4:
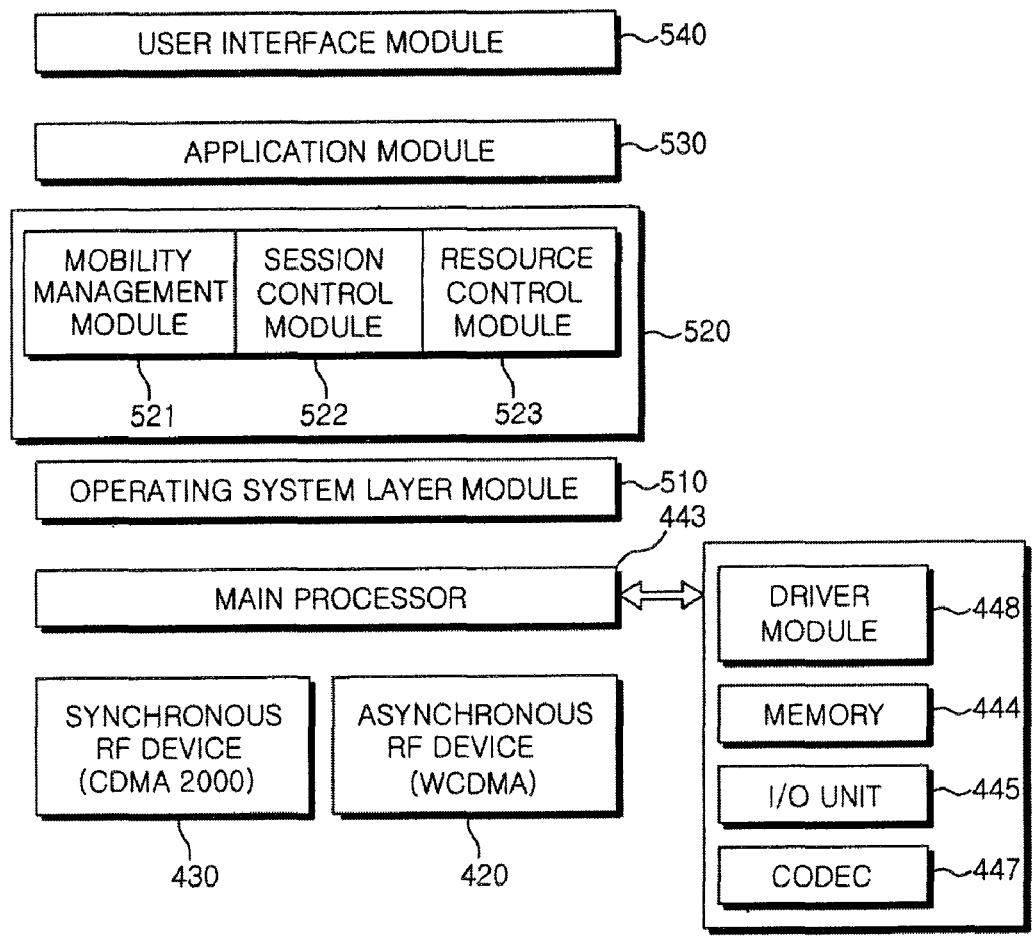
FIG. 4 is a block diagram showing the construction of a platform of the mobile communication terminal according to the present invention.

FIG. 4 is a block diagram showing the construction of the platform of the mobile communication terminal according to the present invention.

Referring to FIG. 4, the platform of the mobile communication terminal of the present invention includes a main processor 443 for controlling the operation of a mobile communication terminal, supporting a wireless Internet environment, and executing call processing through the modem unit of the synchronous RF device 430 or the asynchronous RF device 420, and an Operating System (OS) layer module 510. The main processor 443 is operated while interfacing with the OS layer module 510. The OS layer module 510 can use an operating system, for example, Real Time Execution (REX) or Pioneer Server OS (PSOS), as the operating system of the mobile communication terminal.

Further, the main processor 443 of the platform of the mobile communication terminal 400 is connected to a driver module 448, memory 444 for storing data, an I/O unit 445 for interfacing with peripherals, and a codec 447 for voice processing.

The I/O unit 445 is connected to peripherals, such as a key input unit (not shown) for receiving a key command from a user, a sound output unit (not shown), and a display unit (not shown). The key input unit receives a key input signal from the user and transmits the key input signal to the main processor 443. The sound output unit outputs sound through the speaker of the terminal under the control of the main processor 443. The display unit performs all visual display, including information about the operation of the terminal.

Further, the platform of the present invention includes a control module 520 having a control function including mobility, an application module 530 for application execution, and a user interface module 540.

The control module 520 includes a mobility management module 521 for managing mobility, a session control module 522 for managing call connection and session, and a resource control module 523 for managing system resources.

According to the platform of the mobile communication terminal of the present invention, having the above construction, the main processor 443 selectively sets the synchronous RF device 430 and the asynchronous RF device 420 to an activated state or a parked mode, depending on the actions of the OS of the OS layer module 510. This operation is described in detail below.

Figure 5:
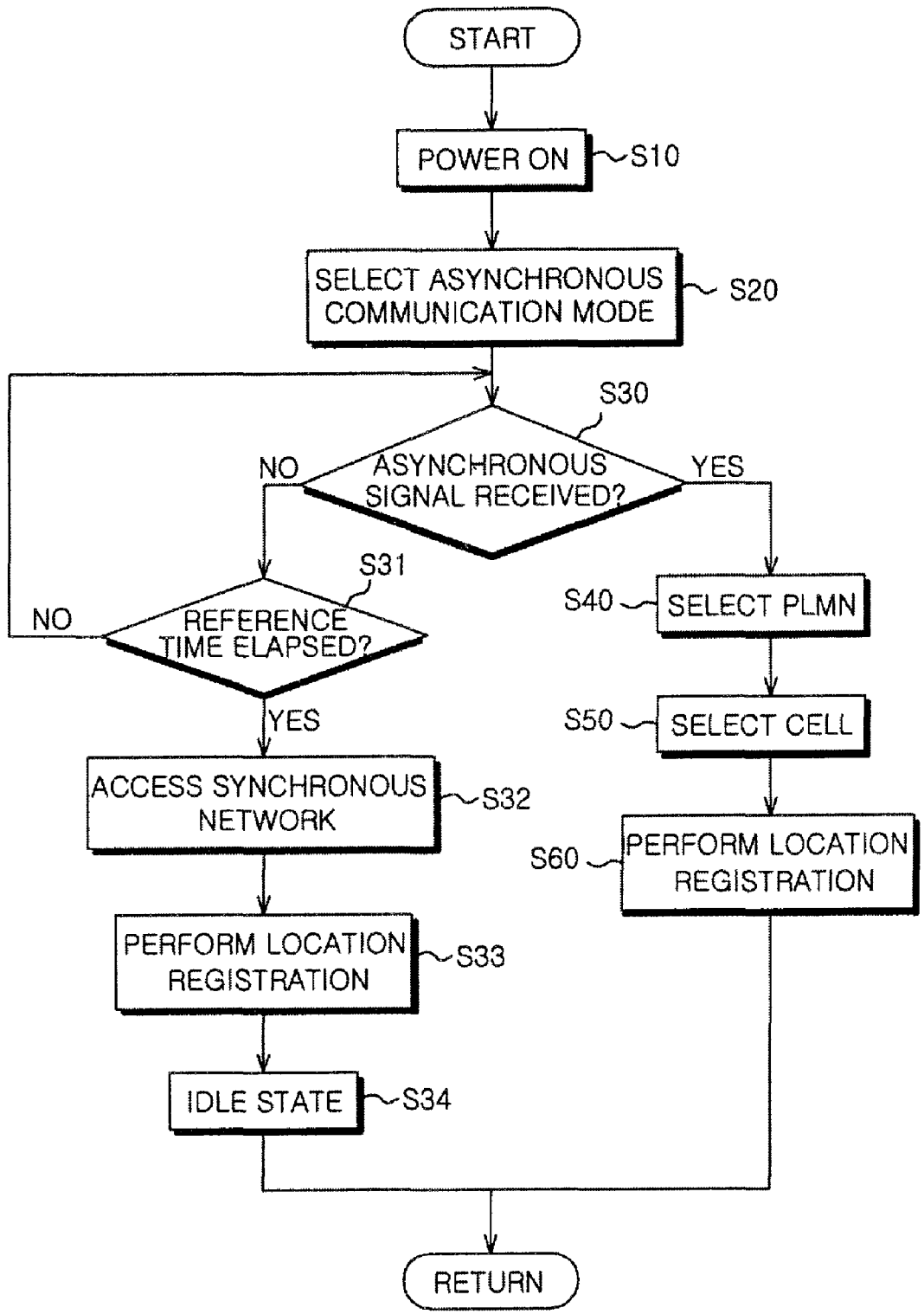
FIG. 5 is a flowchart of a method of controlling a mobile communication terminal according to the present invention.

FIG. 5 is a flowchart of a method of controlling the mobile communication terminal according to the present invention.

Referring to FIG. 5, in the mobile communication terminal of the present invention, as initial power is supplied at step S10, the main processor 443 first selects an asynchronous communication mode at step S20. Therefore, the main processor 443 sets the synchronous RF device 430 to a parked mode, and sets the asynchronous RF device 420 to an activated state.

After the main processor 443 has set the asynchronous RF device 420 to the activated state at step S20, the main processor 443 determines whether a signal has been received from the asynchronous mobile communication network 100 at step S30.

If it is determined that no signal has been received from the asynchronous mobile communication network 100 at step S30, the main processor 443 determines whether a preset reference time has elapsed at step S31. If it is determined that the preset reference time has not elapsed at step S31, the main processor 443 waits for the reception of a signal from the asynchronous mobile communication network 100.

If it is determined that a signal has been received from the asynchronous mobile communication network 100 at step S30, the main processor 443 selects a Public Land Mobile Network (PLMN) and a cell depending on the intensity of the signal received from the radio station 101 of the asynchronous mobile communication network 100 at steps S40 and S50. Further, the main processor 443 transmits a registration request message to the asynchronous mobile communication network 100, thus performing location registration at step S60. At step S60, the registration request message is transmitted to the asynchronous mobile communication network 100 through the radio station 101, and the location is registered in the HLR 110 through the MSC 104 of the asynchronous mobile communication network 100.

Meanwhile, if it is determined that the preset reference time has elapsed at step S31, the main processor 443 sets the asynchronous RF device 420, which is currently activated, to a parked mode, and sets the synchronous RF device 430, which is currently in a parked mode, to an activated state, thereby accessing the synchronous mobile communication network 200 at step S32.

Further, the main processor 443 registers the location in the HLR 208 by transmitting a registration request message to the synchronous mobile communication network 200 at step S33, and stands by in an idle state at step S34.

The embodiment of FIG. 5 is implemented so that, when initial power is supplied, the asynchronous mobile communication network 100 is first selected. However, the present invention can be implemented to allow a user to select the synchronous mobile communication network 200 or the asynchronous mobile communication network 100 through a user interface.

Figure 6:
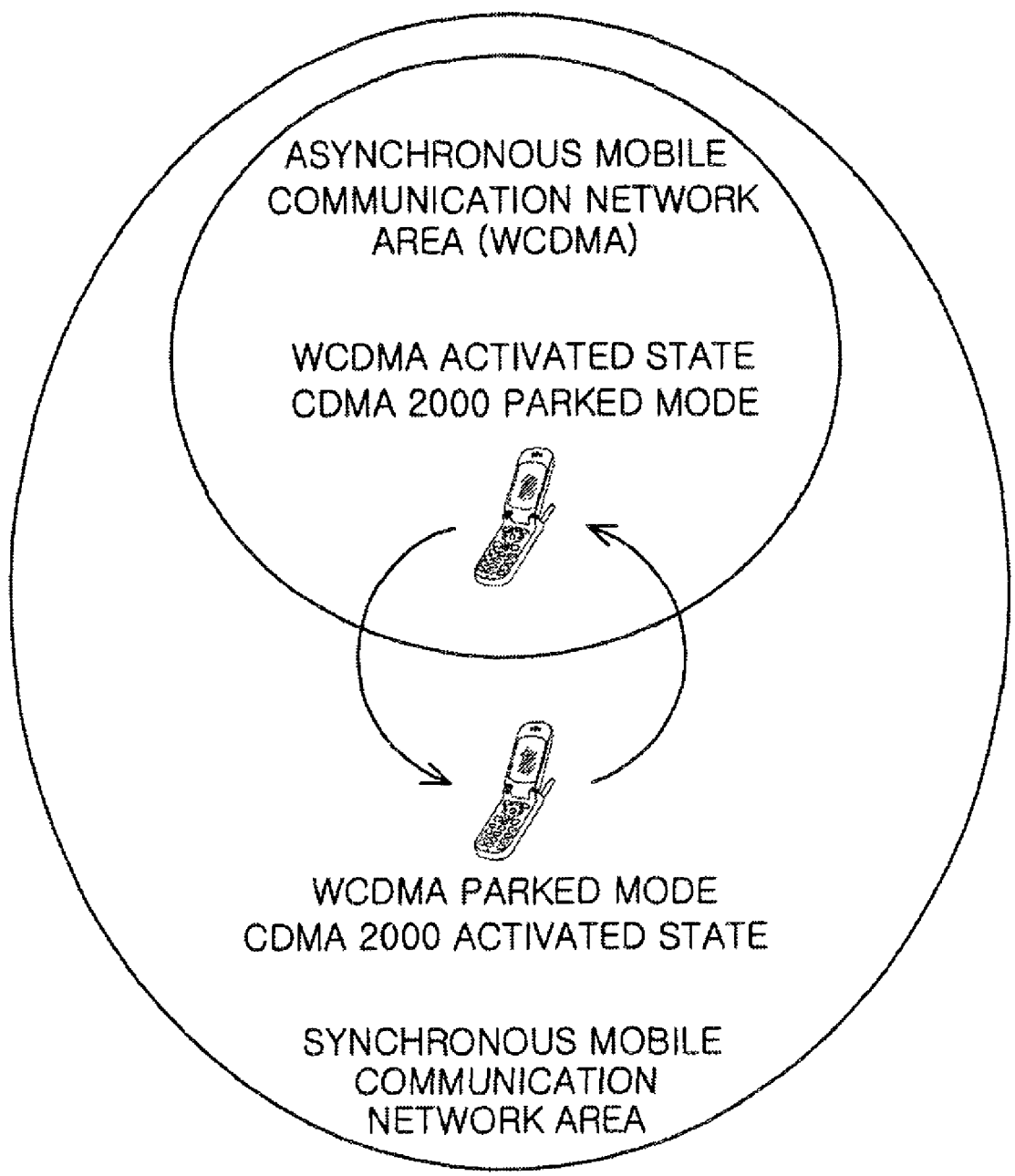
FIG. 6 is a diagram showing the status of the mobile communication terminal in asynchronous and synchronous mobile communication networks according to an embodiment of the present invention.

FIG. 6 is a diagram showing the status of the mobile communication terminal in the asynchronous and synchronous mobile communication networks.

Referring to FIG. 6, in this embodiment, the area of the asynchronous mobile communication network 100 is included in the area of the synchronous mobile communication network 200. In the area of the asynchronous mobile communication network 100, the synchronous RF device (CDMA 2000) 430 is set to a parked mode, and the asynchronous RF device (WCDMA) 420 is set to an activated state. Further, in the area of the synchronous mobile communication network 200, the asynchronous RF device (WCDMA) 420 is set to a parked mode, and the synchronous RF device (CDMA 2000) 430 is set to an activated state.

A handover procedure for the mobile communication terminal between the asynchronous and synchronous mobile communication networks according to the present invention, based on the above process, is described in detail below.

Figure 7:
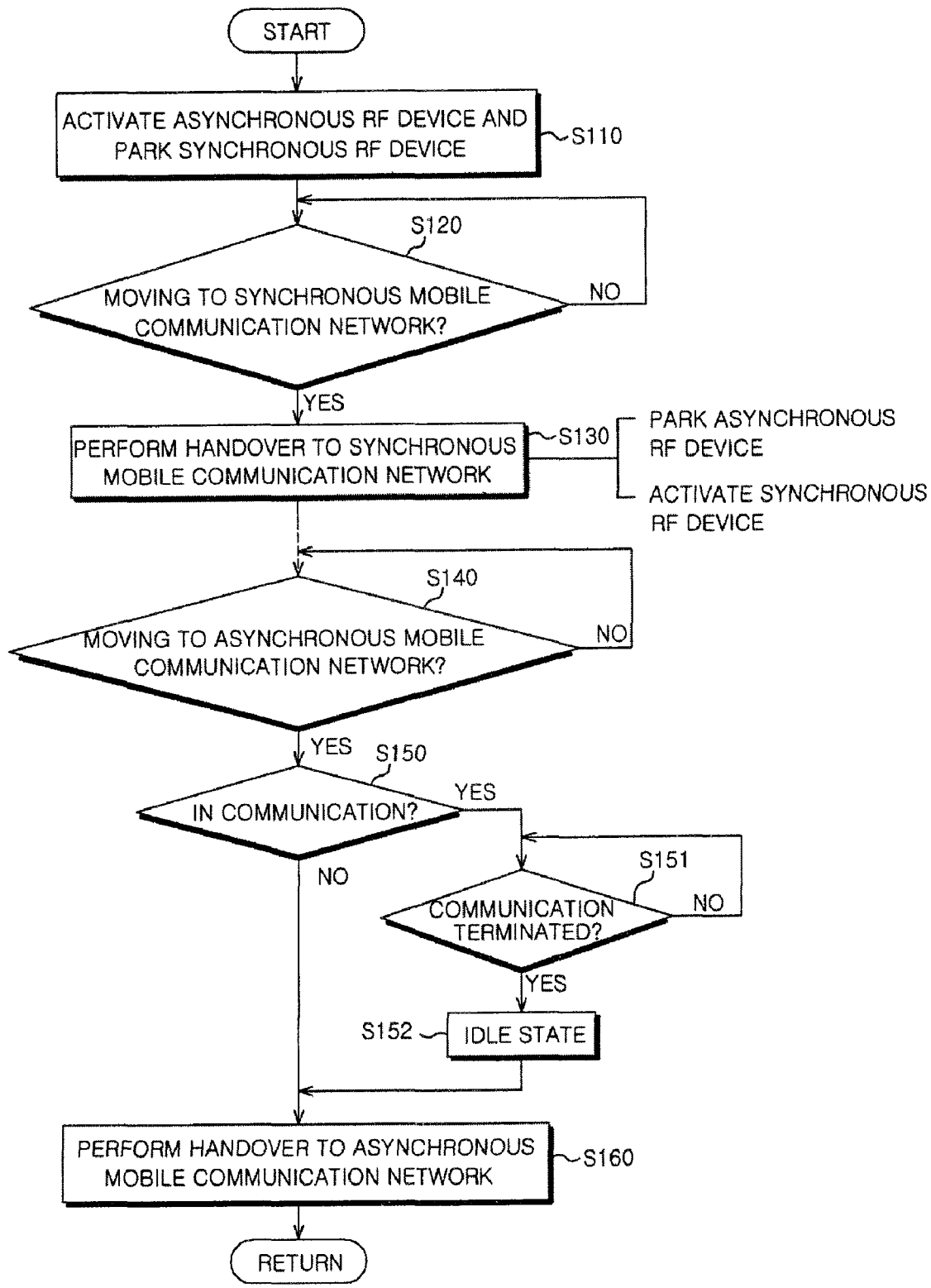
FIG. 7 is a flowchart of a handover process for the mobile communication terminal according to the present invention.

FIG. 7 is a flowchart of a handover process for the mobile communication terminal according to the present invention.

Referring to FIG. 7, if the mobile communication terminal is located in the area of the asynchronous mobile communication network 100, the main processor 443 activates the asynchronous RF device 420 and sets the synchronous RF device 430 to a parked mode at step S110. After step S110, the main processor 443 determines whether the mobile communication terminal 400 is moving from the area of the asynchronous mobile communication network 100 to the area of the synchronous mobile communication network 200 at step S120.

If it is determined that the mobile communication terminal 400 is moving from the area of the asynchronous mobile communication network 100 to the area of the synchronous mobile communication network 200 at step S120, the main processor 443 sets the asynchronous RF device 420 to a parked mode and activates the synchronous RF device 430, thus performing handover to the synchronous mobile communication network 200 at step S130. Accordingly, the mobile communication terminal 400 wirelessly communicates with the synchronous mobile communication network 200 through the synchronous RF device 430.

After step S130, the main processor 443 determines whether the mobile communication terminal 400 is moving from the currently occupied area of the synchronous mobile communication network 200 to the area of the asynchronous mobile communication network 100 at step S140.

If it is determined that the mobile communication terminal 400 is entering the area of the asynchronous mobile communication network 100 from the area of the synchronous mobile communication network 200 at step S140, the main processor 443 determines whether the mobile communication terminal 400 is currently in communication through the synchronous mobile communication network 200 at step S150.

If it is determined that the mobile communication terminal is not currently in communication at step S150, the main processor 443 sets the asynchronous RF device 420 to an activated state and the synchronous RF device 430 to a parked mode, thus performing handover to the asynchronous mobile communication network 100 at step S160.

However, if it is determined that the mobile communication terminal is currently in communication at step S150, the main processor 443 determines whether communication has terminated at step S151. If it is determined that communication has not terminated at step S151, the main processor 443 waits for the termination of the communication, whereas if it is determined that the communication has terminated at step S151, the main processor 443 adjusts the synchronous RF device 430 to an idle state at step S152. Further, the main processor 443 sets the asynchronous RF device 420, which is currently in a parked mode, to an activated state, and sets the synchronous RF device 430, which is currently in an idle state, to a parked mode, thus performing handover to the asynchronous mobile communication network 100 at step S160.

According to the above description, when the mobile communication terminal 400 leaves the currently occupied area of the asynchronous mobile communication network 100, the asynchronous RF device 420 is set to a parked mode and the synchronous RF device 430 is activated, regardless of whether communication is currently being performed through the asynchronous mobile communication network 100, thus handover to the area of the synchronous mobile communication network 200 is immediately performed.

However, if the mobile communication terminal 400 is located in the area of the synchronous mobile communication network 200 and then enters the area of the asynchronous mobile communication network 100, the time to start handover is determined depending on whether communication is currently being performed through the synchronous mobile communication network 200. That is, when the mobile communication terminal is in communication through the synchronous mobile communication network 200, handover is not immediately performed even though the mobile communication terminal 400 has entered the area of the asynchronous mobile communication network 100. If communication performed through the synchronous mobile communication network 200 has terminal handover from the synchronous mobile communication network 200 to the asynchronous mobile communication network 100 is performed.

As described above, this operation is performed because the area of the asynchronous mobile communication network 100 is included in the area of the synchronous mobile communication network 200. After communication performed through the synchronous mobile communication network 200 has terminated, handover to the asynchronous mobile communication network 100 is performed, thus preventing network resources from being needlessly consumed in the performance of handover during communication.

INDUSTRIAL APPLICABILITY

Accordingly, a dual band/dual mode mobile communication terminal and control method thereof according to the present invention is advantageous in that it can not only perform stable handover between an asynchronous mobile communication network and a synchronous mobile communication network, but also terminate current communication, performed through the synchronous mobile communication network, and perform handover to the asynchronous mobile communication network when the mobile communication terminal enters the area of the asynchronous mobile communication network while communicating through the synchronous mobile communication network, thus preventing network resources from being needlessly consumed in the performance of handover during communication.

The invention claimed is:

1. A dual band/dual mode mobile communication terminal wirelessly communicating with an asynchronous mobile communication network and a synchronous mobile communication network, comprising:
   an antenna for transmitting/receiving radio waves to/from the asynchronous mobile communication network and the synchronous mobile communication network;
   an asynchronous Radio Frequency (RF) device for performing asynchronous communication with the asynchronous mobile communication network through the antenna;
   a synchronous RF device for performing synchronous communication with the synchronous mobile communication network through the antenna; and
   a common module for providing common resources to the synchronous and asynchronous RF devices at the time of wirelessly communicating with the synchronous and asynchronous mobile communication networks through the synchronous and asynchronous RF devices, the common module including a main processor adapted to perform overall control for synchronous and asynchronous communication of the mobile communication terminal and to execute applications,
   wherein the main processor is configured to set the asynchronous mobile communication network for initial access when power is supplied and wait for reception of a signal from the asynchronous mobile communication network so as to perform location registration with the asynchronous mobile communication network if the signal has been received, and to set the asynchronous RF device to a parked mode and activate the synchronous RF device if the waiting for reception from the asynchronous mobile communication network has exceeded a preset reference time so as to perform location registration with the synchronous mobile communication network in response to reception of a signal from the synchronous mobile communication network through the synchronous RF device.

2. The mobile communication terminal according to claim 1, wherein the asynchronous RF device comprises:
   an asynchronous RF transmission unit for performing RF transmission to the asynchronous mobile communication network;
   an asynchronous RF reception unit for performing RF reception from the asynchronous mobile communication network;
   an asynchronous modem unit connected both to the asynchronous RF transmission unit and to the asynchronous RF reception unit to control asynchronous communication; and
   a duplexer for providing bidirectional connection between the antenna and both the asynchronous RF transmission unit and the asynchronous RF reception unit.

3. The mobile communication terminal according to claim 1, wherein the synchronous RF device comprises:
   a synchronous RF transmission unit for performing RF transmission to the synchronous mobile communication network;
   a synchronous RF reception unit for performing RF reception from the synchronous mobile communication network;
   a synchronous modem unit connected both to the synchronous RF transmission unit and to the synchronous RF reception unit to control synchronous communication; and
   a duplexer for providing bidirectional connection between the antenna and both the synchronous RF transmission unit and the synchronous RF reception unit.

4. The mobile communication terminal according to claim 1, wherein the common module comprises:
   a plurality of dual port Random Access Memory (RAM) devices connected to the asynchronous RF device and the synchronous RF device, respectively;
   the main processor connected to the dual port RAM devices;
   a memory connected to the main processor and adapted to store data;
   an I/O unit for interfacing with peripherals; and
   a power control module for performing power control.

5. The mobile communication terminal according to claim 4, wherein the main processor is adapted to activate the asynchronous RF device and adjust the synchronous RF device to a parked mode when initial power is supplied.

6. The mobile communication terminal according to claim 4, wherein the main processor is operated so that, if the mobile communication terminal is located in an area of the asynchronous mobile communication network and then leaves the area of the asynchronous mobile communication network, the main processor sets the asynchronous RF device to a parked mode and activates the synchronous RF device, regardless of whether communication is currently being performed through the asynchronous mobile communication network thus immediately performing handover to an area of the synchronous mobile communication network.

7. The mobile communication terminal according to claim 4, wherein the main processor is operated so that, if the mobile communication terminal is located in an area of the synchronous mobile communication network and then enters an area of the asynchronous mobile communication network, the main processor determines a time to start handover depending on whether communication is currently being performed through the synchronous mobile communication network.

8. The mobile communication terminal according to claim 7, wherein:
the area of the asynchronous mobile communication network is included in the area of the synchronous mobile communication network, and
the main processor is operated so that, if the mobile communication terminal enters the area of the asynchronous mobile communication network while communicating through the synchronous mobile communication network, the main processor activates the asynchronous RF device and adjusts the synchronous RF device to a parked mode in an idle state after the communication has terminated thus performing handover to the asynchronous mobile communication network.

9. A method of controlling a dual band/dual mode mobile communication terminal, the mobile communication terminal including an antenna for transmitting/receiving radio waves to/from an asynchronous mobile communication network and a synchronous mobile communication network, an asynchronous Radio Frequency (RF) device for performing asynchronous communication with the asynchronous mobile communication network through the antenna, a synchronous RF device for performing synchronous communication with the synchronous mobile communication network through the antenna, a main processor for performing a control operation at the time of wirelessly communicating with the synchronous and asynchronous mobile communication networks through the synchronous and asynchronous RF devices, and a common module for providing common resources, the mobile communication terminal wirelessly communicating with the synchronous and asynchronous mobile communication networks, the method comprising:
a first step of setting the asynchronous mobile communication network for initial access when power is supplied;
a second step of waiting for reception of a signal from the asynchronous mobile communication network set at the first step;
a third step of performing location registration with the asynchronous mobile communication network if the signal has been received at the second step;
a fourth step of setting the asynchronous RF device to a parked mode and activating the synchronous RF device if the waiting for reception from the asynchronous mobile communication network has exceeded a preset reference time at the second step; and a fifth step of performing location registration with the synchronous mobile communication network if a signal is received from the synchronous mobile communication network through the synchronous RF device.

10. The mobile communication terminal control method according to claim 9, wherein the second step is performed after the main processor has set the synchronous RF device to a parked mode and has activated the asynchronous RF device.

11. The mobile communication terminal control method according to claim 10, wherein, after the signal has been received from the asynchronous mobile communication network at the second step, and the location registration has been performed at the third step, the main processor is operated so that, if the mobile communication terminal leaves an area of the asynchronous mobile communication network, the main processor sets the asynchronous RF device to a parked mode and activates the synchronous RF device, thus performing handover.

12. The mobile communication terminal control method according to claim 10,
wherein the main processor is adapted to set the asynchronous RF device to the parked mode and to perform the location registration with the synchronous mobile communication network.

13. The mobile communication terminal control method according to claim 12, wherein:
the area of the asynchronous mobile communication network is included in the area of the synchronous mobile communication network, and
the mobile communication terminal control method further comprises the steps of:
determining whether the mobile communication terminal is currently in communication through the synchronous mobile communication network if the mobile communication terminal enters the area of the asynchronous mobile communication network after location registration with the synchronous mobile communication network has been performed at the third step;
waiting for handover if it is determined that the mobile communication terminal is currently in communication; and
the main processor setting the synchronous RF device to a parked mode and activating the asynchronous RF device if the mobile communication terminal enters an idle state after the communication has terminated, thus performing handover to the asynchronous mobile communication network.

* * * * *